United States Patent [19]

Kilham

[11] Patent Number: 4,846,111
[45] Date of Patent: Jul. 11, 1989

[54] BENDABLE COILED WIRE BIRD PERCH ASSEMBLY

[76] Inventor: Peter Kilham, Mill Rd., Foster, R.I. 02825

[21] Appl. No.: 243,498

[22] Filed: Sep. 12, 1988

Related U.S. Application Data

[63] Continuation-in-part of Ser. No. 140,256, Dec. 31, 1987.

[51] Int. Cl.⁴ .............................................. A01K 39/00
[52] U.S. Cl. ....................................................... 119/51 R
[58] Field of Search ................................ 119/24, 25, 26

[56] References Cited

U.S. PATENT DOCUMENTS

| | | | |
|---|---|---|---|
| 1,052,234 | 2/1913 | Gaertner | 119/26 X |
| 1,850,508 | 3/1932 | Leindorf | 119/26 |
| 1,951,550 | 3/1934 | Little | 119/26 |
| 2,045,395 | 6/1936 | Leindorf | 119/26 |
| 2,796,043 | 6/1957 | Albert | 119/24 |

FOREIGN PATENT DOCUMENTS 10858  7/1898  United Kingdom ................ 119/26

*Primary Examiner*—Gene Mancene
*Assistant Examiner*—R. Thomas Price
*Attorney, Agent, or Firm*—Robert J. Doherty

[57] ABSTRACT

A bird perch assembly formed of a bendable tightly wound wire perch formed in the shape of a generally hollow cylinder and further provided with a keeper device such that its potential for lateral elongation is prevented or diminished. Such perch assembly is adapted for replaceable mounting in a wild bird feeder opening such that the perch downwardly bends when a large, that is, a heavy, bird attempts to rest thereon and remains generally straight to support a small, that is, a light, bird resting thereon.

15 Claims, 1 Drawing Sheet

BENDABLE COILED WIRE BIRD PERCH ASSEMBLY

This invention is a continuation-in-part of U.S. patent application Ser. No. 140,256 filed Dec. 31, 1987 and entitled Bendable Coiled Wire Bird Perch.

BACKGROUND AND OBJECTS OF THE INVENTION

This invention relates to a perch assembly for a wild bird feeder and more particularly to a perch assembly which discriminates between large and small birds such that large birds will slide off the perch and not be able to gain access to the feed within the feeder while small birds will be able to alight thereon and successfully obtain, feed in the desired manner.

Such previous application describes a bird perch formed of a bendable, tightly wound wire coil having a first end adapted for replaceable mounting in a bird feeder opening. The perch body is adapted to be downwardly bent when a large, that is, heavy, bird attempts to rest thereon and remains generally straight to support small, that is, light, birds resting thereon. This is a particularly desirable feature, and has shown decided operational success in field use. However, inasmuch as it is highly desirable to be able to form the spring coil from a non-corrodible material such as stainless steel, some problems have occurred since stainless steel cannot be adequately heat treated after it is coiled. Therefore, the coil tends to be able to be stretched in use as by a squirrel or other animal over stressing the perch as by pulling. Such action by these large pests can open coil portions such that the intended normal straight lateral extension of the coil away from the feeder wall to which it is attached is impaired.

It would be advantageous to provide coil means that prevent the over stressing of individual coils. One obvious solution would be to use a regular steel that could be adequately heat treated to assure the necessary snap-back of the individual coils once they are elongated but regular steel is subject to undesirable rusting in use conditions or if provided with a rustproof coating necessitates additional handling and expense.

Accordingly, an initial object of the present invention is to provide means by which such a bendable coil bird perch is mechanically maintained against elongating over stresses yet which adquately provides for the main function of the device, that is, the ability of the coil to bend downward when contacted by large birds.

A secondary feature and object of the invention is to provide a bird perch assembly as indicated above which primarily bends evenly throughout its length from its connection with the feeder wall to which it is attached.

These and other objects of the present invention are accomplished by a bird perch assembly adapted for use with wild bird feeders of the type having at least one feed opening extending through a substantially vertically disposed wall thereof, said perch assembly outwardly laterally extending from said wall at a point substantially in line with and beneath said opening, said perch assembly comprising a perch and a keeper device, said perch composed entire of a hollow, straight cylindrical, wound wire coil having individual turns, and being tightly wound with adjacent individual turns touching each other, said coil having first and second terminal ends and an intermediate laterally extending portion with said first terminal end positioned in a perch opening extending into said wall and said second terminal end terminating at a position spaced from said wall, said keeper device having a bendable, non-extendible elongated body laterally extending along said coil and terminating in first and second connectors respectively engaged to said first and second coil terminal ends, that portion of said perch outwardly spaced from said wall being of a diameter easily grasped by perching birds and further being easily bendable such that large birds will cause the wire to bend downward and cause such birds to slide off or fly away as a result of being forced to an insecure or untenable position while small birds will not cause the wire to bend substantially downward.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention.

DETAILED DESCRIPTION OF THE INVENTION

Figure 1:
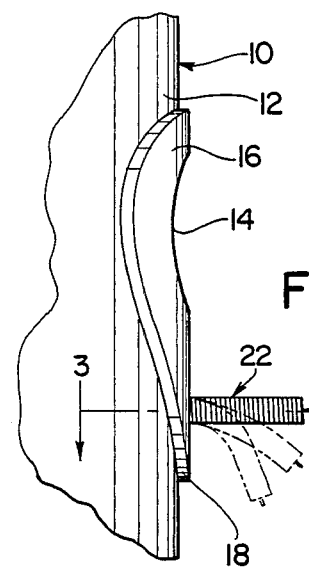
FIG. 1 is a partial side elevational view of a tubular bird feeder incorporating the novel perch assembly of the present invention.

Turning now to the drawing and particularly FIG. 1 thereof, the overall bird feeder type on which the discriminating perch assembly of the present invention may be utilized as a substitute for the solid perch normally provided thereon is shown. It should be pointed out, however, that the perch of the present invention may be used on almost all bird feeder types if they have a feed opening disposed in a generally vertically disposed wall of a bird feeder and a perch positioned adjacent to such feed opening. Also, the discriminating perch assembly of the present invention may be utilized as a retrofit unit for bird feeders already in the field or as part of a new bird feeder construction.

The feeder 10 construction shown in FIG. 1 is of an overall tubular configuration including a body 12 preferably formed from a transparent or translucent plastic material. Such body 12 includes at least one feed opening 14 disposed through the side of the tube body 12. The opening is at least partially surrounded or protected by a metal ring 16 including a downwardly extending ear portion 18 in which an opening 20 is provided and into which the perch assembly 22 of the present invention is adapted to extend.

The perch assembly 22 includes the coiled wire perch 24 and a keeper device 26. The perch 24 is preferably formed from a continuous wire length that is wound upon an arbor to form an essentially longitudinal extending body 28 in which the individual windings 30 thereof contact each other. Thus the outside surface of the body or intermediate portion 28 is essentially closed, that is, openings are not present between the individual windings 30 such that a bird's claws could become undesirably lodged there-between or otherwise become caught. In addition, the close or contacting spacing of the windings 30 insures that the perch 24 will bend evenly throughout its length.

Preferably, the wire is a stainless steel material of about 0.020 inch diameter, and twenty to forty windings are provided such that the outward extent or overall perch length when mounted on the tubular bird feeder is between about ½ and ¾ inches. The outside diameter of such perch 24 is preferably between 1/16 and 3/16 inches.

As previously alluded to, stainless steel wire is generally hardened by working it as when it is formed into its appropriate wire form such that when subsequently formed into the coil form of the perch 24 presents a construction which can be over stressed, that is, the individual windings 30 permanently elongated. Such elongation would present gaps that could catch the bird's claws and wound also undesirably cause the coil perch 24 to bend at those elongated points. Thus the condition that is sought is one in which the overall desired perch bendability and springiness is achieved such that the weight of large birds such as Blue Jays will force the perch to downwardly bend as shown in the progression of the FIG. 1 dotted line representations such that the bird will become frightened and leave the feeder or physically slide therefrom. It should be pointed out that small birds of a materially lesser weight can alight, perch or otherwise rest upon the perch 24 and not force it downwardly and thus obtain the feed in the desired manner.

The opening 20 in the ear portion 18 of the metal ring or shield 16 is of a configuration to match the first end 32 of the perch construction which is preferably outwardly flared. Thus, the opening 20 is inwardly outwardly flared to present a sloped side wall 34 for contact with the outwardly flared first end 32 of the perch 24. The other or second terminal end 36 of the perch 24 terminates in a generally planar face disposed at right angles to the normal longitudinal attitude of the perch 24 and generally formed by the edge surfaces of the terminal individual winding 30.

Figure 2:
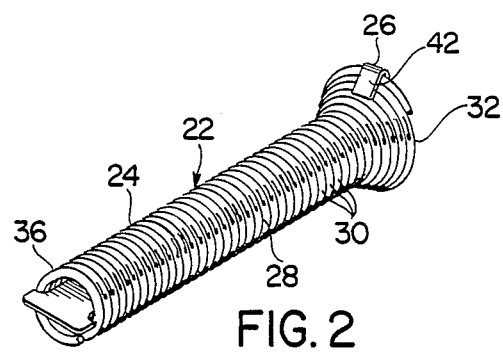
FIG. 2 is a perspective view of the perch assembly of the present invention.
Figure 3:
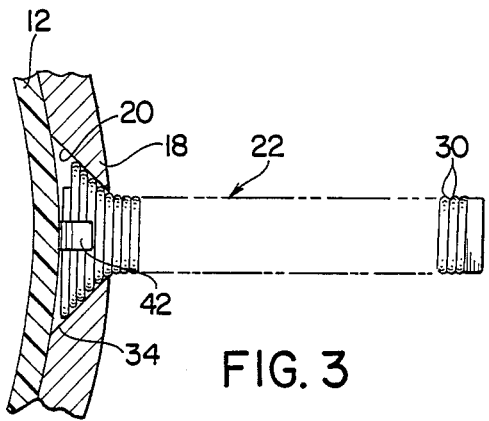
FIG. 3 is a sectional view taken along the line 3—3 of FIG. 1.
Figure 4:
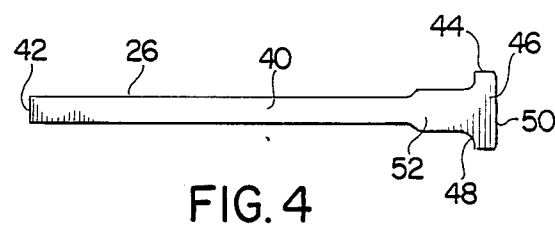
FIG. 4 is a plan view of the keeper device of the present bird perch assembly.
Figure 5:
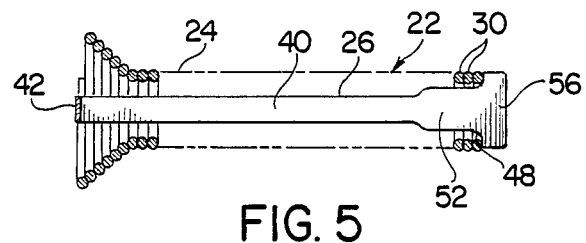
FIG. 5 is an assembly sectional view showing the manner in which the coil and keeper portions of the bird perch assembly are connected.

The keeper device 26 of the perch assembly 22 is best shown by reference to FIG. 4. Therein it may be seen that the keeper 26 includes an elongated body 40 preferably formed from a strip of bendable yet non-extendable material such as phosphor bronze. The strip height is such that it may easily be extended through interior portions of the coil perch 24 and is of a thickness that provides for bendability ease yet prevents extension of the body 40. In practice, the strip to match that of the previously indicated dimensions for the coil perch 24 is formed of 0.005 inch thickness material and is approximately 1/16 inch high. The body 40 terminates at opposed ends in a first connector 42 and a second connector 44. The first connector 42, in essence, is a bent-shaped hook formed from the strip material of the body 40 as best shown in FIGS. 2, 3 and 5. The other end of the body 40 terminates in a second connector 44 including a generally T-shaped tab 46 having inner and outer surfaces 48 and 50 respectively and including a stem portion 52. In order to assemble the perch assembly 22 component parts, the first end of the keeper device 26 is extended through the coil 22 body from right to left as shown in the drawings and then the first end thereof clenched over the flared end of the coil. In such a position, it may be clear that the inner surface 48 of the tab 46 engages the edge surface of the outermost winding 30 of the coil 24 an that the stem portion 52 contacts interior portions of a plurality of windings adjacent such terminal second end.

It may thus be apparent that the perch assembly 22 may be attached or assembled with the feeder prior to the attachment of the ring 18 thereto simply by passing the second terminal end through the opening 20 and thereafter engaging the ring 18 to the wall 12 such that the outwardly flared first terminal end 32 of the perch 24 as well as the hook 42 bent therearound firmly engage the wall 12, that is, the ring 18 serves to hold the perch assembly 24 such that it outwardly laterally extends in the desired fashion. The keeper 26 may provide a slight compression to the coil 24 or simply assure the individual windings 30 thereof are maintained in contact with each other such that if a pest such as a squirrel or like will be foiled in any attempts to undesirably elongate the perch assembly 24. In that regard, the stem portion 52 serves to center the strip 26 within the coil 24. Also, the strip 26 further by reason of its assuring contact between adjacent individual windings 26 additionally insures that the desired bending will take place. Preferably and for maximum bendability, it is desirable to place the flat surface of strip body 40 upwardly as shown in FIGS. 2 and 3 as opposed to its vertical edge up position shown in FIG. 5. Some experimentation in this area has found that by twisting the perch assembly between such aforementioned positions, that is, between the full flat position shown in FIG. 3 and the full upright position shown in FIG. 5, that some relative stiffening of the bendability of the coil 24 is achieved. In other words, in the edge up position shown in FIG. 5, there is some enhanced stiffening such that the weight needed to downwardly bend the coil 24 in the desired fashion is increased and thus some weight differentiation between the type of birds discriminated against can be achieved.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A bird perch assembly adapted for use with wild bird feeders of the type having at least one feed opening extending through a substantially vertically disposed wall thereof, said perch assembly outwardly laterally extending from said wall at a point substantially in line with and beneath said opening, said perch assembly comprising a perch and a keeper device, said perch composed essentially entirely of a hollow, straight, cylindrical, wound wire coil having individual turns, and being tightly wound with adjacent individual turns touching each other, said coil having first and second terminal ends and an intermediate laterally extending portion with said first terminal end positioned in a perch opening extending into said wall and said second terminal end terminating at a position spaced from said wall, said keeper device having a bendable, non-extendible elongated body laterally extending along said coil and terminating in first and second connectors respectively engaged to said first and second coil terminal ends, said perch having a major portion thereof outwardly spaced from said wall, said major portion being of a diameter easily grasped by perching birds and further being easily bendable such that large birds will cause the wire to bend downward and cause such birds to slide off or fly away from being in an untenable position while small birds will not cause the wire to bend substantially downward.

2. The bird perch assembly of claim 1, said keeper device body being a flat material strip extending along the hollow interior of said coil intermediate portion.

3. The bird perch assembly of claim 2, said keeper device first connector being a terminal hook bent over the coil first terminal end to mechanically attach said device to said coil thereat.

4. The bird perch assembly of claim 3, said keeper device second connector being a generally T-shaped tab having a stem and bar with said bar in turn having an inner edge adjacent said stem, said inner edge engaged with said coil second terminal end.

5. The bird perch assembly of claim 4, said keeper device second connector stem of a height generally equal to that of the interior diameter of said coil second terminal end such that said stem contacts interior portions of a plurality of the individual turns adjacent said second terminal end so as to centrally position said second connector with respect to said coil second terminal end.

6. The bird perch assembly of claim 5, said strip being approximately 0.005 inches thick and 1/16 inch wide and preferably made of phosphor bronze.

7. The bird perch assembly of claim 6, said coil being wound from about 0.020 inch spring wire with about 20 to 40 individual windings.

8. The bird perch assembly of claim 7, said coil extending outwardly from said wall a distance of between $\frac{1}{2}$ inch and $\frac{3}{4}$ inch.

9. The bird perch assembly of claim 3, wherein the feeder is of the type having a protective collar mounted against the outside of said wall and disposed around said feed opening, said perch disposed in said collar, said first terminal end of said coil being outwardly flared with said flared end and said first connector terminal hook disposed against said wall.

10. The bird perch assembly of claim 2, said keeper device body strip having opposed major flat surfaces and minor edge surfaces with such flat surfaces disposed in a horizontal plane disposed normal to the vertically disposed feeder wall.

11. The bird perch assembly of claim 10, said perch assembly rotatable such that said strip can be disposed in use positions between a normally flat up position and an edge up position 90 degrees rotated therefrom.

12. The bird perch assembly of claim 1, said keeper device maintaining a light compression force on said coil.

13. The bird perch assembly of claim 1, said coil constructed to bend evenly throughout its length.

14. The bird perch assembly of claim 1 wherein the feeder is of the type having a protective collar mounted against the outside of said wall and disposed around said feed opening, said perch opening disposed in said collar.

15. The bird perch assembly of claim 14, said first terminal end of said coil being outwardly flared with said flared end disposed against said wall and those portions of said coil proximal said flared end extending through said perch opening so as to attach said perch to said feeder.

* * * * *